March 24, 1964  R. S. ASH  3,126,428
BACTERIA PROOF EVAPORATIVE COOLER
Filed Jan. 11, 1960
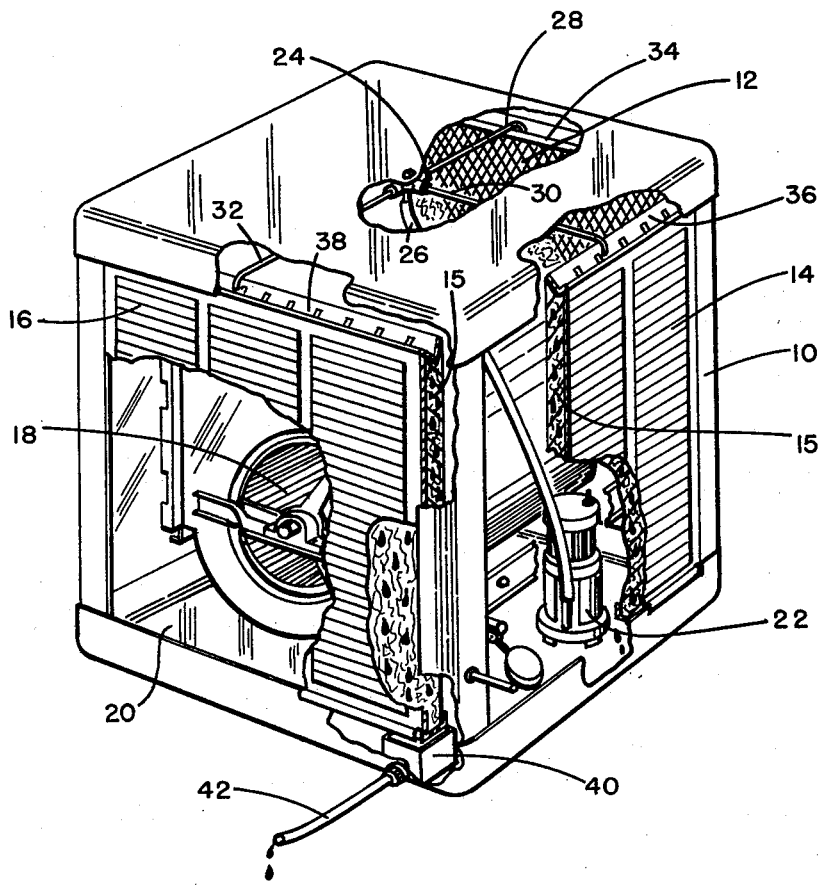
INVENTOR.
ROBERT S. ASH
BY
Wm. H. Dean
PATENT AGENT

United States Patent Office

3,126,428
BACTERIA PROOF EVAPORATIVE COOLER
Robert S. Ash, Phoenix, Ariz., assignor to McGraw-Edison Company, Elgin, Ill., a corporation of Delaware
Filed Jan. 11, 1960, Ser. No. 1,750
4 Claims. (Cl. 261—97)

This invention relates to a bacteria proof evaporative cooler and more particularly to an evaporative cooler having hygroscopic evaporative cooler pads impregnated with a bacteriostat.

The term "bacteriostat" as used herein, is a chemical agent which prevents multiplication of bacteria.

Evaporative coolers have heretofore employed hygroscopic evaporative cooler pads such as those made of wood excelsior and have utilized recirculating pumps to pump water drained from the pads back to an elevated position at the upper portions of the pad so that water is continuously used. In such evaporative coolers, bacteria tends to grow during warm weather and create serious problems. One unpleasant conditon arises when the bacteria multiplies to such an extent that the cool air is laden with bacteria and unpleasant due to the odor of the bacteria.

Accordingly, it is an object of the invention to provide a bacteria proof evaporative cooler having hygroscopic pads which are treated with a bacteriostat which prevents the multiplication of bacteria in an evaporative cooler.

Another object of the invention is to provide an evaporative cooler wherein the evaporative cooler pads are treated with a bacteriostat and operated at a relative humidity of 75 percent or greater, thereby causing the bacteriostat to become sufficiently active to kill bacteria.

Another object of the invention is to provide a particular combination of a bacteriostat and a specific type of hygroscopic material whereby an evaporative cooler pad is rendered bacteria proof for great periods of time as, for example, an entire summer during which the effectiveness of the bacteriostat, with respect to inhibition of bacteria growth, does not appreciably deteriorate.

Another object of the invention is to provide a bacteria proof evaporative cooler which does not require the addition of any compounds or sterilizing agents to the sump water in order to kill bacteria in the sump thereof.

A further object of the invention is to provide a bacteria proof evaporative cooler which delivers sanitary pleasant air, even under the most humid high temperature weather conditions.

Further objects and advantages of the invention may be apparent from the following specification appended claims and accompanying drawings, in which:

The figure of the drawings is a perspective view of an evaporative cooler in accordance with the present invention and showing portions thereof broken away and in section to amplify the illustration.

As shown in the drawing, the invention comprises an evaporative cooler 10 having pads 12, 14 and 16 disposed outwardly of a blower 18 which is adapted to force air through the pads. Below the pads is a sump pan 20 adapted to receive water which is picked up by a pump 22 and delivered to a manifold 24 via a tube 26. The manifold is provided with branch tubes 28, 30, and 32 which deliver water from the pump to troughs 34, 36, and 38 in the upper edges of the pads 12, 13 and 16 respectively. Water delivered from the tubes 28, 30, and 32 passes downwardly through the hygroscopic fiberous material or excelsior in the pads 12, 14, and 16 and drains into a portion of the sump pan 20 therebelow. Thus, the water is recirculated through the pads by the pump 22 while a small portion of the water is drained off by means of a conventional bleed off device 40 and a tube 42 connected therewith.

The pads 12, 14 and 16 are provided with hygroscopic material 15 which is preferably aspen wood shavings which may be of a cross section approximately 1/64 of an inch or greater as desired, however, this hygroscopic material may be any other suitable material such as shavings of other kinds of wood or fiberous material such as shredded paper.

This hygroscopic material 15, as hereinbefore pointed out, is preferably aspen wood shavings in accordance with the present invention and these aspen wood shavings are treated with a bacteriostat such as a heavy metal compound which impregnates the shavings. The heavy metal compound is provided with a wetting agent which reduces surface tension in the hygroscopic materials and is particularly effective in aspen shavings which are very porous and fuzzy. These shavings have hair like fibers extending in profusion therefrom and are also very durable. The composition which will be hereinafter described, provides a very durable fix of a bacteriostat in evaporative cooler pads in accordance with the present invention.

An example of a composition used to impregnate the hygroscopic material 15 of the evaporative cooler pads is approximately as follows:

| | Percent |
|---|---|
| Propyleneglycol | 9.0 |
| Boric acid | 1.0 |
| 2-ethyl hexanol | 1.2 |
| Phenyl mercuric borate | 1.10 |
| Dimethyl benzyl borate } 50% Ammonium borate | .12 |
| Phenyl mercuric chloride | .10 |
| Inactive ingredients | 87.48 |

The inactive ingredients may contain any suitable solvent for the foregoing elements so the composition may be utilized in a liquid form to mix with water in proportions which, for example, may be approximately 400 parts of water to one part of the foregoing solution or composition.

An additional wetting agent such as alkyl aryl sulfonates, having 30% to 40% active ingredients is added to the foregoing solution in a ratio of 100-1 water and additional wetting agent, respectively.

The hygroscopic material 15, such as the aspen wood fibers of the evaporative cooler pads, is first processed by soaking in the foregoing solution. The material is then dried and formed into the evaporative cooler pads of the cooler as shown in the drawing, whereupon the evaporative cooler is operated so that water delivered to the pads raises their relative humidity to a region above 75 percent. The active ingredients of the bacteriostat when operating under such humid conditions become a bacteriacide thus bacteria are killed during operation of the cooler.

It will be understood that the solution in which the bacteriostat is present when used to treat the fibers of the material 15 penetrates throughout the cross section of these fibers due to the particular porous and fuzzy character of the fibers and also due to the pressure of a wetting agent in the foregoing solution. This renders the material 15 of the pads very durable with respect to retention of the bacteriostat. It will be understood that a particularly compatible relationship exists between the hygroscopic material and the bacteriostat in accordance with the present invention which provides an extremely durable protective arrangement which may be continuously operated in a region of relative humidity above 75 percent.

In operation, it has been found by actual tests that the present invention inhibits the multiplication of bacteria over periods of many months without any noticeable change in the effectiveness of the bacteriostat retained by aspen fibers.

Since the operation of the cooler may be continuous throughout the summer months in areas where temperatures are high and relative humidity is high, there is a tendency of bacteria to breed. However, in a cooler in accordance with the present invention, the bacteria cannot multiply and are actually reduced. Therefore, the air emanating from the cooler remains clean and pleasant.

It will be obvious to those skilled in the art that various modifications of the present invention may be resorted to in a manner limited only by a just interpretation of the following claims.

I claim:

1. In an evaporative cooler the combination of: evaporative cooler pads having hygroscopic material therein said hygroscopic material impregnated with a composition comprising propyleneglycol, boric acid, ethyl hexanol, phenyl mercuric borate, dimethyl benzyl borate, ammonium borate, and phenyl mercuric chloride, said hygroscopic material adapted to be operated with a moisture content above 75% relative humidity.

2. In an evaporative cooler the combination of: evaporative cooler pads composed of aspen wood shavings having a fuzzy, porous structure and impregnated with a composition having propyleneglycol, boric acid, ethyl hexanol, phenyl mercuric borate, dimethylbenzyl, borate, ammonium borate and phenyl mercuric chloride, said pads adapted to be operated with a moisture content above 75% relative humidity.

3. In an evaporative cooler the combination of: evaporative cooler pads composed of aspen wood shavings having a fuzzy, porous structure and impregnated with a composition having 9.0 percent propyleneglycol 1.0 percent boric acid, 1.2 percent ethyl hexanol, 1.10 percent phenyl mercuric borate, .06 percent dimethyl benzyl borate, .06 percent ammonium borate, and .10 percent phenyl mercuric chloride, and 87.48 percent inactive ingredients, said pads adapted to be operated with a moisture content above 75% relative humidity.

4. A process for producing evaporative cooler pads comprising: the preparation of an aqueous solution of a bacteriostat, composed of propyleneglycol, boric acid, ethyl hexanol, phenyl mercuric borate, dimethylbenzyl borate, ammonium borate and phenyl mercuric chloride then adding a wetting agent to the solution, then immersing aspen fibers in said solution until impregnated with said bacteriostat then drying said fibers, and then forming them into an evaporative cooler pad.

References Cited in the file of this patent

UNITED STATES PATENTS

| | | |
|---|---|---|
| 2,391,558 | Essick | Dec. 25, 1945 |
| 2,411,815 | Sowa | Nov. 26, 1946 |
| 2,650,885 | Hudson | Sept. 1, 1953 |
| 2,655,454 | Farber et al. | Oct. 13, 1953 |
| 2,895,848 | Baker | July 21, 1959 |

OTHER REFERENCES

McKelvey and Brooke, "Industrial Cooling Tower," Elsevier Pub. Co., 1959, pp. 235–243.